(12) United States Patent
Maul et al.

(10) Patent No.: US 10,260,879 B2
(45) Date of Patent: Apr. 16, 2019

(54) SENSOR DEVICE AND METHOD FOR OPERATING A SENSOR DEVICE HAVING AT LEAST ONE SEISMIC MASS

(71) Applicant: Robert Bosch GmbH, Stuttgart (DE)

(72) Inventors: Robert Maul, Pforzheim (DE); Mirko Hattass, Stuttgart (DE); Rolf Scheben, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 144 days.

(21) Appl. No.: 15/116,924

(22) PCT Filed: Jan. 21, 2015

(86) PCT No.: PCT/EP2015/051055
§ 371 (c)(1),
(2) Date: Aug. 5, 2016

(87) PCT Pub. No.: WO2015/117817
PCT Pub. Date: Aug. 13, 2015

(65) Prior Publication Data
US 2016/0356599 A1 Dec. 8, 2016

(30) Foreign Application Priority Data
Feb. 5, 2014 (DE) .................. 10 2014 202 053

(51) Int. Cl.
*G01C 19/574* (2012.01)
*G01C 19/56* (2012.01)
(Continued)

(52) U.S. Cl.
CPC ....... *G01C 19/574* (2013.01); *G01C 19/5719* (2013.01); *G01C 19/5747* (2013.01)

(58) Field of Classification Search
CPC .............. G01C 19/574; G01C 19/5712; G01C 19/5747; G01C 19/5762; G01C 19/5719;
(Continued)

(56) References Cited

U.S. PATENT DOCUMENTS

2005/0022596 A1    2/2005  Lehureau et al.
2008/0276707 A1*  11/2008  Sutton ................ G01C 19/5726
                                                              73/504.04
(Continued)

FOREIGN PATENT DOCUMENTS

DE   10 2008 042 369 A1    4/2010
EP        2 108 964 A2    10/2009
(Continued)

OTHER PUBLICATIONS

International Search Report corresponding to PCT Application No. PCT/EP2015/051055, dated Sep. 1, 2015 (German and English language document) (9 pages).

*Primary Examiner* — Helen C Kwok
(74) *Attorney, Agent, or Firm* — Maginot, Moore & Beck LLP

(57) ABSTRACT

A sensor drive includes at least one first seismic mass and an operating apparatus. The operating apparatus is configured to put the first seismic mass into oscillatory motion such that (i) a projection of the oscillatory motion of the first seismic mass onto a first spatial direction is a first harmonic oscillation of the first seismic mass at a first frequency, and (ii) a projection of the oscillatory motion of the first seismic mass onto a second spatial direction oriented at an angle to the first spatial direction is a second harmonic oscillation of the first seismic mass at a second frequency not equal to the first frequency. A method includes operating such a sensor device having at least one seismic mass.

11 Claims, 5 Drawing Sheets

(51) Int. Cl.
*G01C 19/5719* (2012.01)
*G01C 19/5747* (2012.01)

(58) Field of Classification Search
CPC ............ G01C 19/5726; G01C 19/5642; G01C 19/5755
See application file for complete search history.

(56) References Cited

U.S. PATENT DOCUMENTS

| | | |
|---|---|---|
| 2009/0139330 A1 | 6/2009 | Pavelescu et al. |
| 2009/0205423 A1* | 8/2009 | Takagi ............... G01C 19/5755 73/504.14 |
| 2013/0098153 A1* | 4/2013 | Trusov ............... G01C 19/5719 73/504.16 |
| 2013/0205897 A1* | 8/2013 | Deimerly ........... G01C 19/5712 73/504.12 |

FOREIGN PATENT DOCUMENTS

| | | |
|---|---|---|
| EP | 2 333 572 A1 | 6/2011 |
| JP | 2009-198206 A | 9/2009 |
| JP | 2012-202799 A | 10/2012 |

\* cited by examiner

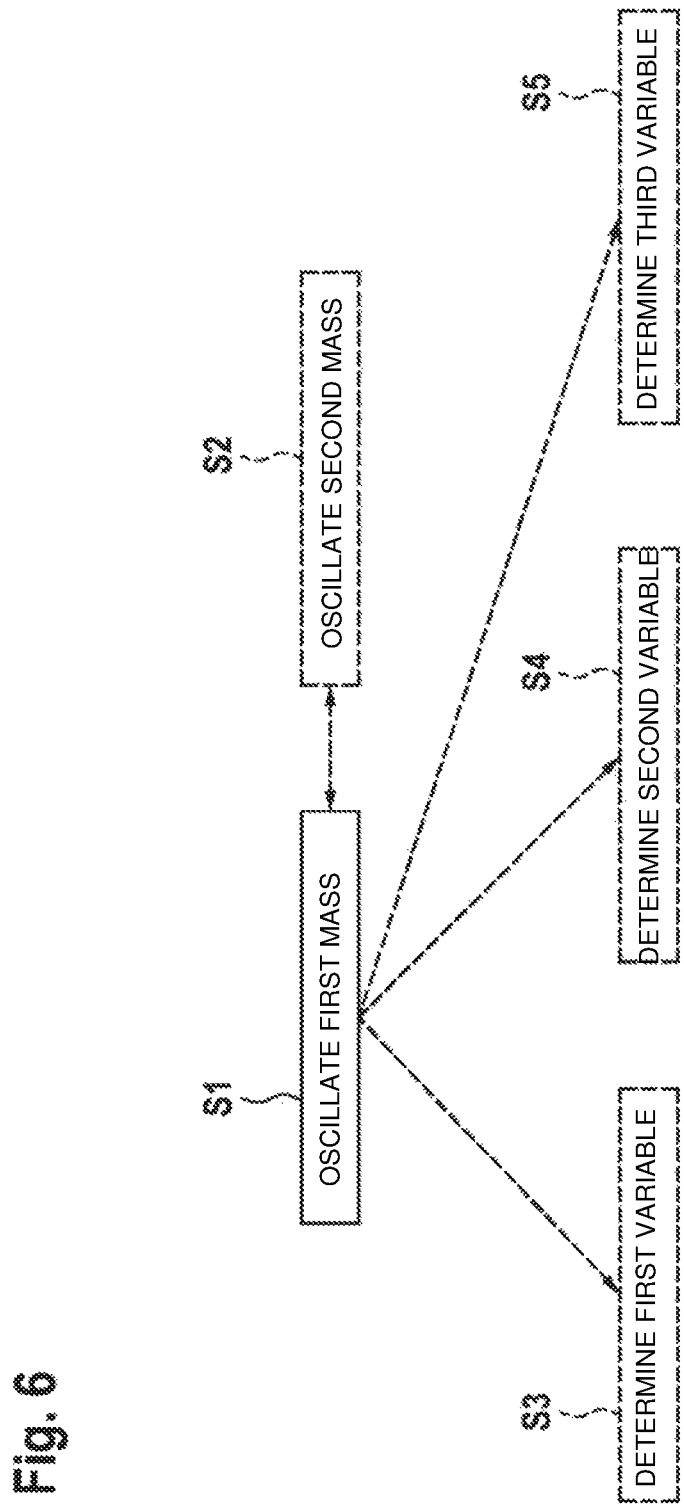

SENSOR DEVICE AND METHOD FOR OPERATING A SENSOR DEVICE HAVING AT LEAST ONE SEISMIC MASS

This application is a 35 U.S.C. § 371 National Stage Application of PCT/EP2015/051055, filed on Jan. 21, 2015, which claims the benefit of priority to Serial No. DE 10 2014 202 053.0, filed on Feb. 5, 2014 in Germany, the disclosures of which are incorporated herein by reference in their entirety.

The disclosure relates to a sensor device. Furthermore, the disclosure relates to a method for operating a sensor device having at least one seismic mass.

BACKGROUND

DE 10 2008 042 369 A1 describes coupling structures for a rotational rate sensor device and a rotational rate sensor device which is equipped therewith. The rotational rate sensor devices described in DE 10 2008 042 369 A1, for detecting a rotation of a body both about a first rotational axis and about a second rotational axis, have at least one first seismic mass which can be set in a harmonic oscillation with a frequency in a first spatial direction, and a second seismic mass which can be set in a harmonic oscillation with the same frequency in a second spatial direction. The rotational rate sensor devices in DE 10 2008 042 369 A1 for detecting a rotation of the body in all three spatial directions have at least three seismic masses.

SUMMARY

The disclosure provides a sensor device and a method for operating a sensor device having a seismic mass.

The present disclosure permits a number of seismic masses required on a sensor device to be reduced. For example, a sensor device having three sensitive axes can be implemented by means of the present disclosure, said sensor device having at maximum two seismic masses, in particular just one seismic mass. Specifically, by means of the present disclosure it is possible to implement a rotational rate sensor device which has at maximum two seismic masses, in particular just one seismic mass, and by means of which nevertheless rotational rates of a rotatable body about all three spatial directions can be measured. By means of the disclosure, it is therefore possible to minimize the sensor device. Furthermore, when the present disclosure is used, the sensor device can be embodied in a more lightweight fashion. The minimization of the sensor device which can be implemented by means of the present disclosure facilitates its arrangement in a measuring position. Furthermore, the sensor device which is embodied in a smaller and more lightweight fashion can more easily be attached to a body in which it is desired to detect or measure a rotational motion thereof.

In one advantageous embodiment, the sensor device also comprises at least one second seismic mass, wherein by means of the operating apparatus the second seismic mass can be set in an oscillating motion in such a way that a projection of the oscillating motion of the second seismic mass onto the first spatial direction is asymmetrical with respect to the first harmonic oscillation of the first seismic mass, and at the same time a projection of the oscillating motion of the second seismic mass onto the second spatial direction is asymmetrical with respect to the second harmonic oscillation of the first seismic mass. An asymmetrical oscillating motion of the second seismic mass can be understood to mean that the projection of the oscillating motion of the second seismic mass onto the first spatial direction is phase-shifted, or in anti-phase, by a phase angle of 180° with respect to the first harmonic oscillation of the first seismic mass, while at the same time the projection of the oscillating motion of the second seismic mass onto the second spatial direction is phase-shifted, or in anti-phase, by a phase angle of 180° with respect to the second harmonic oscillation of the first seismic mass. Such asymmetry of the oscillating motion of the second seismic mass with respect to the oscillating motion of the first seismic mass facilitates a signal evaluation which can be carried out by means of the operating apparatus, and permits automatic filtering out of errors.

For example, the first seismic mass can be connected to the second seismic mass via at least one coupling structure. It is to be noted that specifically the coupling structures described in DE 10 2008 042 369 A1 can be used to connect the two seismic masses. However, the implementability of the at least one coupling structure is not restricted to these coupling structure.

The operating apparatus is preferably configured to determine at least a first variable relating to a periodic deflection of the first seismic mass with the first frequency in a third spatial direction which is oriented inclined with respect to the first spatial direction and the second spatial direction, and/or a periodic deflection of the second seismic mass with the first frequency in the third spatial direction, and to define and output at least one information item relating to a rotational motion of the sensor device about the second spatial direction or relating to a component of a magnetic field which is oriented in the second spatial direction, taking into account the at least one first variable which is determined. Therefore, a sensitive axis is implemented in the second spatial direction on the sensor device, in relation to which axis, for example, a rotational rate, an angular speed, a rotational speed, a rotational intensity, a rotational force and/or a magnetic field strength can be defined.

For the purpose of operation as a magnetic field sensor, the seismic mass is periodically energized by means of current-conducting lines. The direction of the flow of current corresponds here to the axes of the mechanical excitation.

As an alternative or in addition thereto, the operating apparatus is configured to determine at least one second variable relating to a periodic deflection of the first seismic mass with the second frequency in the third spatial direction which is oriented inclined with respect to the first spatial direction and the second spatial direction, and/or a periodic deflection of the second seismic mass with the second frequency in the third spatial direction, and to define and output at least one information item relating to a rotational motion of the sensor device about the first spatial direction or relating to a component of a magnetic field which is oriented in the first spatial direction, taking into account the at least one second variable which is determined. Therefore, specifically for the values enumerated above yet another sensitive axis is also implemented on the sensor device.

The operating apparatus can likewise also be configured to determine at least one third variable relating to a periodic deflection of the first seismic mass with the first frequency in the second spatial direction, a periodic deflection of the first seismic mass with the second frequency in the first spatial direction, a periodic deflection of the second seismic mass with the first frequency in the second spatial direction and/or a periodic deflection of the second seismic mass with the second frequency in the first spatial direction, and to define and output at least one information item relating to a rotational motion of the sensor device about the third spatial direction which is oriented inclined with respect to the first spatial direction and the second spatial direction, or relating to a component of a magnetic field which is oriented in the third spatial direction, taking into account the at least one third variable which is determined. A third sensitive axis can therefore be implemented on the sensor device, which axis is oriented inclined (preferably perpendicularly) with respect to a plane extending from the first spatial direction and the second spatial direction. Despite the use of at maximum two seismic masses, in particular just one seismic mass, a sensor device with three sensitive axes is implemented.

In a further advantageous embodiment, the operating apparatus comprises at least one electrode which is arranged spaced apart in the first spatial direction on the first seismic mass and/or on the second seismic mass, at least one folding electrode which is arranged spaced apart in the second spatial direction on the first seismic mass and/or on the second seismic mass, and/or at least one electrode which is arranged spaced apart in the third spatial direction on the first seismic mass and/or on the second seismic mass. The at least one electrode can be used in this case both for setting the first seismic mass and/or the second seismic mass in the desired oscillating motion as well as for determining the at least one first variable, second variable and/or third variable defined above. The operating apparatus can therefore be equipped with a multifunctional, cost-effective and easy-to-manufacture component.

In a further advantageous embodiment, for the purpose of operation as a magnetic field sensor the current-conducting lines are routed via the suspension springs of the seismic masses.

The sensor device preferably comprises only the first seismic mass and the second seismic mass as seismic masses. The sensor device can therefore be embodied in a comparatively small and lightweight fashion.

The sensor device can preferably be a rotational rate sensor component, a rotational rate sensor, a component for a Lorentz-force-based magnetic field sensor or a Lorentz-force-based magnetic field sensor. The advantageous sensor device can therefore be designed for a multiplicity of possible uses.

The advantages described above can also be ensured when carrying out a corresponding method for operating a sensor device with at least one seismic mass. The method can be developed in accordance with the embodiments of the sensor device described above.

BRIEF DESCRIPTION OF THE DRAWINGS

Further features and advantages of the present disclosure are explained below with reference to the figures, of which:

FIG. 6 shows a flowchart explaining an embodiment of the method for operating a sensor device with at least one seismic mass.

DETAILED DESCRIPTION

Figure 1:
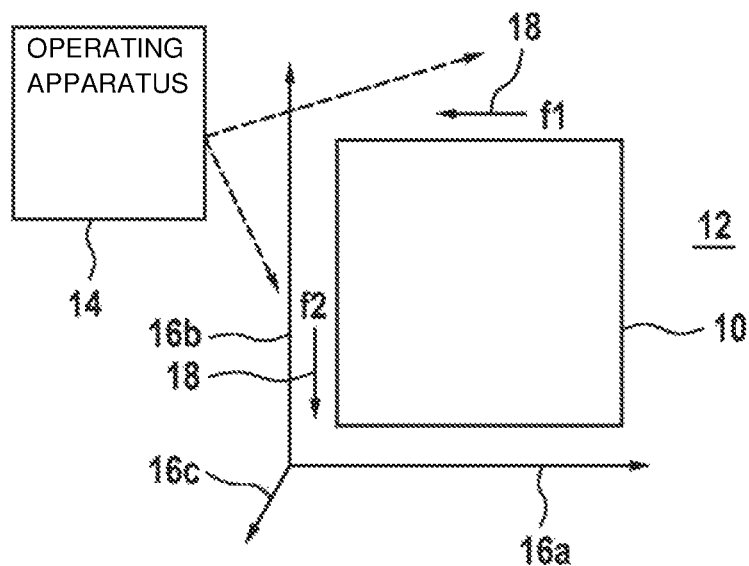
FIG. 1 shows a schematic illustration of a first embodiment of the sensor device.

FIG. 1 shows a schematic illustration of a first embodiment of the sensor device.

The sensor device illustrated schematically in FIG. 1 has just one seismic mass 10. The seismic mass 10 can be understood to be a mass which is connected to a (positionally fixed) mount 12 via at least one spring (not outlined) and/or via at least one coupling structure (not illustrated), in such a way that the seismic mass can be adjusted with respect to the mount 12.

Furthermore, the sensor device has an operating apparatus 14 by means of which the seismic mass 10 can be set in an oscillating motion. The seismic mass 10 can be set in its oscillating motion by means of the operating apparatus 14 in such a way that a projection of the oscillating motion of the seismic mass 10 onto a first spatial direction/spatial axis 16$a$ is a first harmonic oscillation of the seismic mass 10 with a first frequency f1 in the first spatial direction 16$a$, and at the same time a projection of the oscillating motion of the seismic mass 10 onto a second spatial direction/spatial axis 16$b$ is a second harmonic oscillation of the seismic mass 10 with a second frequency f2 in the second spatial direction 16$b$. The second frequency f2 is unequal to the first frequency f1. Furthermore, the second spatial direction 16$b$ is oriented inclined with respect to the first spatial direction 16$a$. In particular, the first spatial direction 16$a$ and the second spatial direction 16$b$ can be oriented perpendicularly with respect to one another.

In FIG. 1, the oscillating motion of the seismic mass 10 is represented figuratively by means of the arrows 18. The seismic mass 10 is also preferably connected to the mount 10 in such a way that the seismic mass 10 can also be adjusted from its oscillating motion in respect to the mount in a third spatial direction 16$c$ which is oriented inclined with respect to the first spatial direction 16$a$ and the second spatial direction 16$b$. The third spatial direction/spatial axis 16$c$ can, in particular, be oriented perpendicularly with respect to a plane extending from the spatial directions 16$a$ and 16$b$, perpendicularly with respect to the first spatial direction 16$a$ and/or perpendicularly with respect to the second spatial direction 16$b$.

Although the sensor device in FIG. 1 has just the one seismic mass 10, by means of a corresponding configuration of the operating apparatus 14 it is possible to define at least one information item relating to a rotational motion of the sensor device (or of the rotatable body which is investigated therewith) or relating to a magnetic field strength of a magnetic field (not illustrated) for at least two sensitive axes/spatial directions 16$a$, 16$b$ and 16$c$, in particular for three sensitive axes/spatial directions 16$a$, 16$b$ and 16$c$. (This will be explained in more detail below). The at least one information item which can be output by means of the operating apparatus 14 can be, for example, a rotational rate, an angular speed, a rotational speed, a rotational intensity, a rotational force and/or a magnetic field strength. However, the examples enumerated here, of the information which can be defined by means of the operating apparatus 14, are only to be interpreted by way of example.

The sensor device in FIG. 1 can perform the same functions as rotational rate sensors according to the prior art with at least two harmonically oscillating masses or conventional magnetometers, equipped with at least two harmonically oscillating masses. In particular, by means of the simultaneous excitability of the seismic mass 10 with respect to the first harmonic oscillation (with the first frequency f1 in the first spatial direction 16$a$) and with respect to the second harmonic oscillation (with the second frequency f2 in the second spatial direction 16b), at least one harmonically oscillating mass which is conventionally also required can be eliminated. This can also be paraphrased in such a way that the second harmonic oscillation, which can be brought about simultaneously with the first harmonic oscillation, of the (same) seismic mass 10 implements a multi-functionality of the seismic mass 10, which makes at least one conventionally additionally required oscillating mass superfluous. Therefore, the sensor device in FIG. 1 can be embodied in a small and lightweight fashion despite its versatility.

Figure 2:
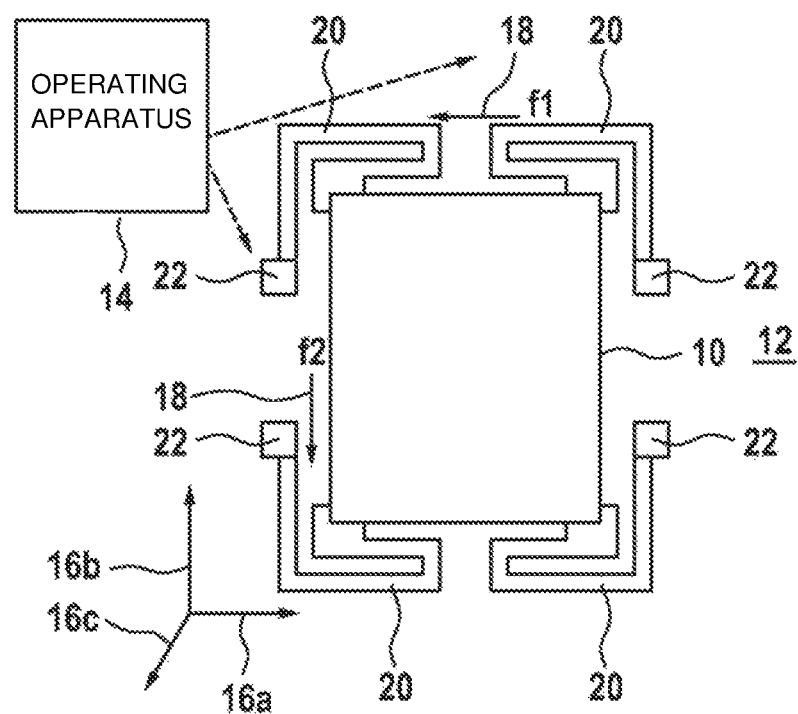
FIG. 2 shows a schematic illustration of a second embodiment of the sensor device.

FIG. 2 shows a schematic illustration of a second embodiment of the sensor device.

The sensor device which is illustrated schematically in FIG. 2 has a seismic mass 10 which is connected to the mount 12 via four helical springs 20. For example, the seismic mass 10 has a solid-rectangle-shaped basic structure, wherein in each case a helical spring 22 extends from each edge running perpendicularly with respect to the mount 12 to an anchoring region 22 on the mount 12. The helical springs 20 ensure the advantageous adjustability of the seismic mass 10 optionally in the first spatial direction 16a, in the second spatial direction 16b and in the third spatial direction 16c. However, it is to be noted that the connection of the seismic mass 10, represented in FIG. 2, to the mount 12 via the four helical springs 20 is to be interpreted as being merely by way of example. Instead of or in addition to the helical springs 20, the seismic mass 10 can also be connected to the mount 12 via another type of spring.

The sensor device 10 in FIG. 2 also has the operating device 14 with which the seismic mass 10 can be set in the oscillating motion represented by means of the arrows 18. The seismic mass 10 which is illustrated in FIG. 2 can therefore be excited to undergo the oscillating motion, in such a way that the seismic mass 10 oscillates harmonically with the first frequency f1 in the first spatial direction 16a, and harmonically with the second frequency f2 in the second spatial direction 16b.

Figure 3:
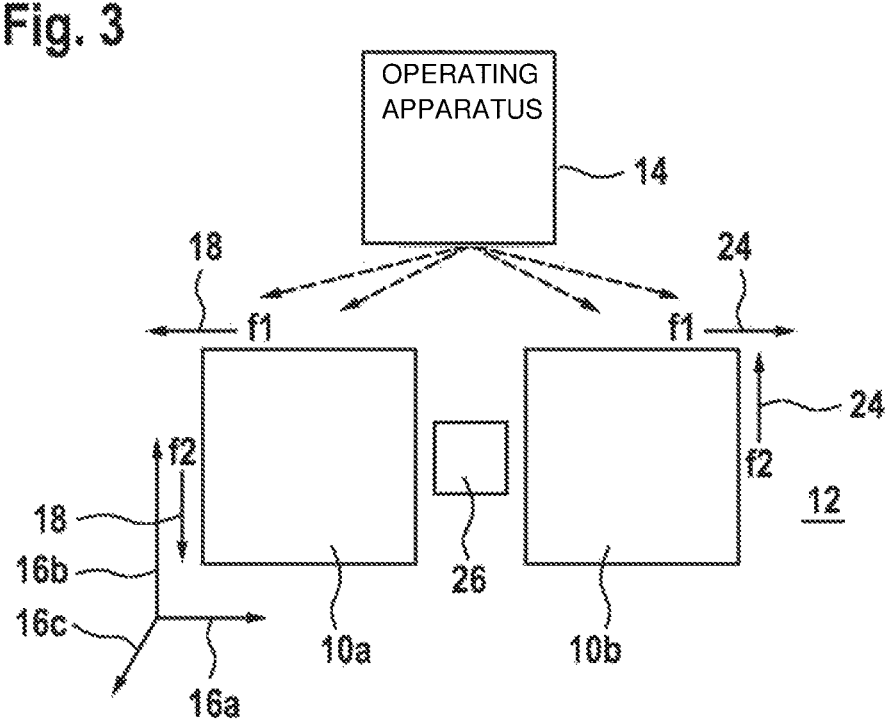
FIG. 3 shows a schematic illustration of a third embodiment of the sensor device.

FIG. 3 shows a schematic illustration of a third embodiment of the sensor device.

The sensor device in FIG. 3 comprises, in addition to a first seismic mass 10a which can be set, by means of the operating apparatus 14, in the oscillating motion represented figuratively by means of the arrows 18, a second seismic mass 10b. The second seismic mass 10b can also be understood to be a mass which is adjustably connected to the mount 12 via at least one spring (not outlined) and/or at least one coupling structure (not illustrated). The second seismic mass 10b can be set, by means of the operating apparatus 14, in an oscillating motion represented by means of the arrows 24, in such a way that a projection of the oscillating motion of the second seismic mass 10b onto the first spatial direction 16a is asymmetrical with respect to the first harmonic oscillation of the first seismic mass 10a and at the same time a projection of the oscillating motion of the second seismic mass 10b onto the second spatial direction 16b is asymmetrical with respect to the second harmonic oscillation of the first seismic mass 10a. The second seismic mass 10b which is set in the oscillating motion represented by means of the arrows 24 therefore oscillates harmonically with the first frequency f1 in the first spatial direction 16a and harmonically with the second frequency f2 in the second spatial direction 16b. Furthermore, the projection of the oscillating motion of the second seismic mass 10b onto the first spatial direction 16a is phase-shifted through 180° with respect to the first harmonic oscillation of the first seismic mass 10a, while at the same time the projection of the oscillating motion of the second seismic mass 10b onto the second spatial direction 16b is phase-shifted through 180° with respect to the second harmonic oscillation of the first seismic mass 10a. The asymmetry of the oscillating motions, represented figuratively by means of the arrows 18 and 24, of the seismic masses 10a and 10b with respect to one another can also be paraphrased as anti-phase harmonic oscillation.

The asymmetry of the oscillating motions of the seismic masses 10a and 10b facilitates a signal evaluation for defining the at least one information item which can be output by means of the sensor device. Furthermore, the asymmetry of the oscillating motions of the seismic masses 10a and 10b implements automatic filtering out of error signals. Since examples of this are already known from the prior art, more details on this will not be given here.

The first seismic mass 10a is preferably connected to the second seismic mass 10b via at least one coupling structure 26. The desired asymmetry of the oscillating motions of the seismic masses 10a and 10b can easily be brought about by means of the coupling structure 26. For example, the coupling structures which are described in DE 10 2008 042 369 A1 can be used for connecting the seismic masses 10a and 10b. However, it is also to be noted that the possibility of connecting the seismic masses 10a and 10b is not limited to the use of one of these coupling structures.

Figure 4:
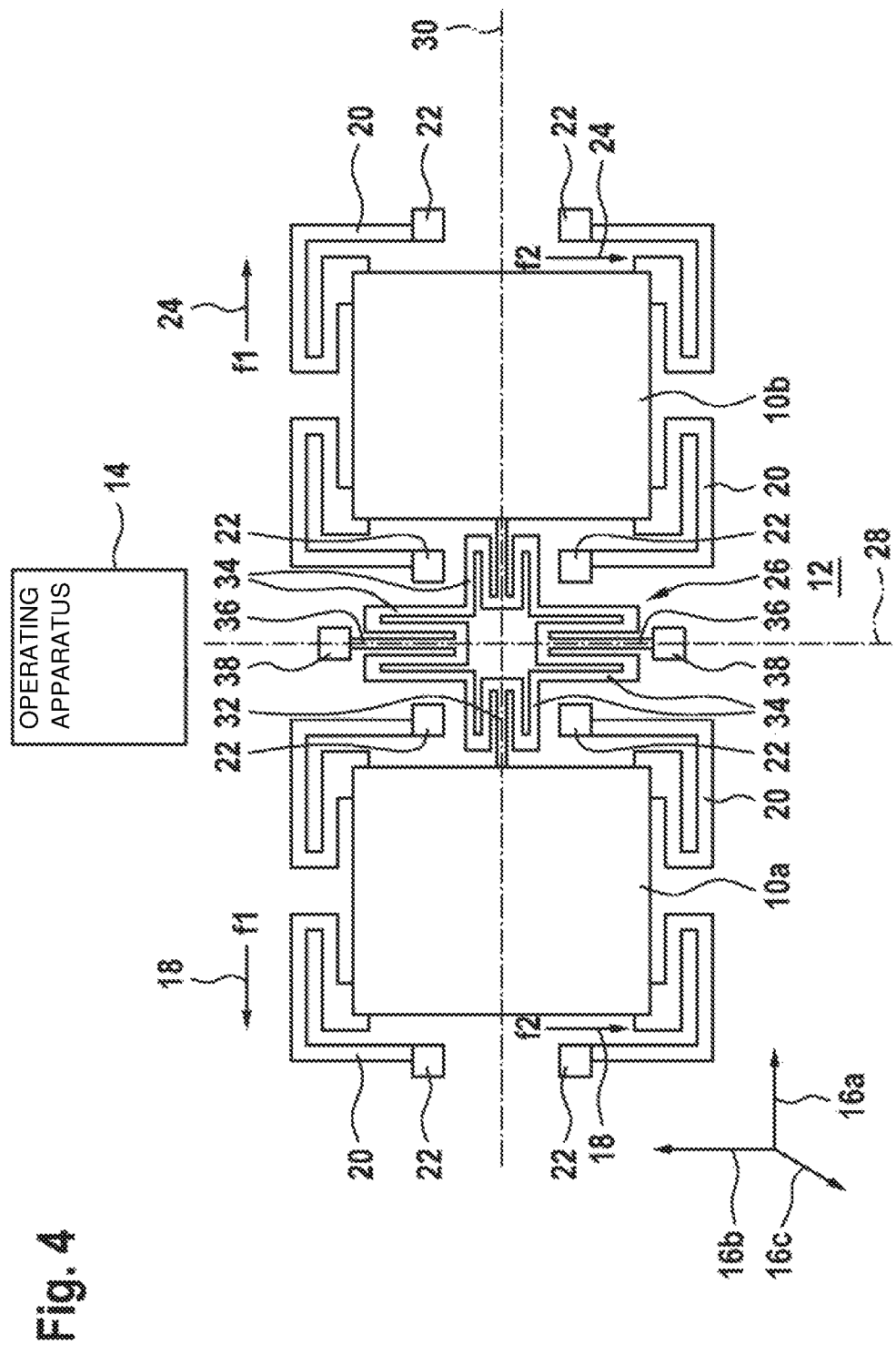
FIG. 4 shows a schematic illustration of a fourth embodiment of the sensor device.

FIG. 4 shows a schematic illustration of a fourth embodiment of the sensor device.

In the sensor device in FIG. 4, each of the seismic masses 10a and 10b is connected to the mount 12 via, in each case, four helical springs 20. Furthermore, the seismic masses 10a and 10b are connected to one another via a coupling structure 26 which is embodied mirror-symmetrically with respect to a first axis of symmetry 28 which runs centrally between the seismic masses 10a and 10b and mirror-symmetrically with respect to a second axis of symmetry 30 which centrally intersects the seismic masses 10a and 10b. A first web section 32 extends from each seismic mass 10a and 10b along the second axis of symmetry 30 which is connected to a ring composed of eight bending springs 34 of the coupling structure 26. Furthermore, the ring composed of the eight bending springs 34 is connected to the mount 12 via two second web sections 36 which extend along the first axis of symmetry 28 to, in each case, one anchoring region 38 on the mount 12. A bending spring 34 is connected to each side of each web section 32 and 36, wherein each of the bending springs 34 which are connected to the first web sections 32 is connected to one of the bending springs 34 which are connected to the second web sections 36. Each bending spring is U-shaped. The ends of all the U-shaped bending springs point into the interior of the ring. The bending springs 34 which are connected to the first web sections 32 can be expanded by means of a comparatively small force along the first axis of symmetry 28. Correspondingly, the bending springs 34 which are connected to the second web regions 36 can also be expanded along the second axis of symmetry 30 by means of a comparatively small force. However, it is also to be noted that not only the coupling device 26 which is illustrated in FIG. 4 ensures the desired asymmetry of the oscillating motions of the seismic masses 10a and 10b.

Figure 5:
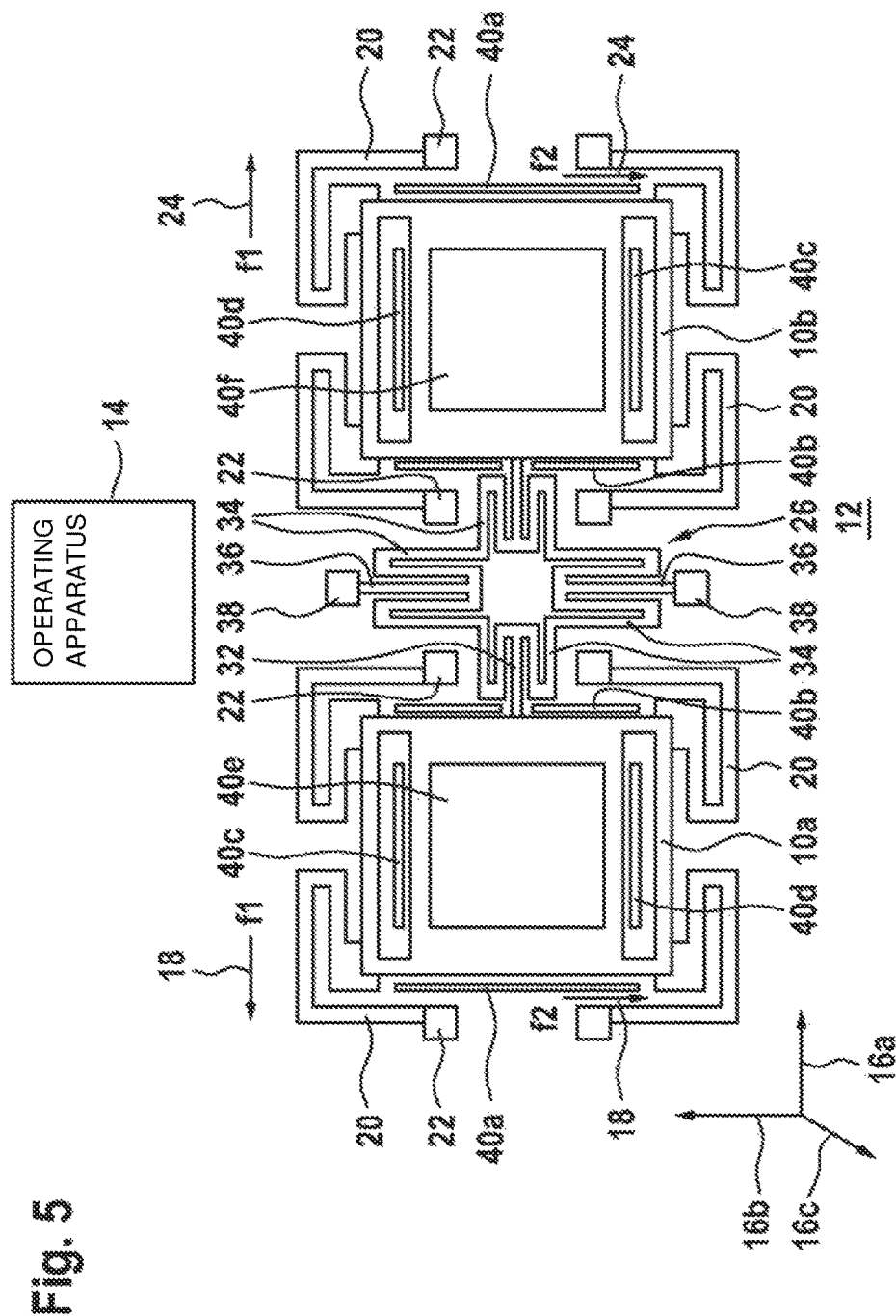
FIG. 5 shows a schematic illustration of a fifth embodiment of the sensor device.

FIG. 5 shows a schematic illustration of a fifth embodiment of the sensor device.

In the embodiment in FIG. 5, the operating apparatus 14 comprises two first electrodes 40a and two second electrodes 40b, wherein one of the first electrodes 40a and one of the second electrodes 40b are arranged spaced apart in the first spatial direction 16a on the first seismic mass 10a, and another of the first electrodes 40a and another of the second electrodes 40b are arranged spaced apart in the first spatial direction 16a on the second seismic mass 10b. The first electrodes 40a each lie on a side, facing away from the coupling structure 26, of the seismic masses 10a and 10b. Each of the second electrodes 40b lies between the assigned seismic mass 10a or 10b and the coupling structure 26. The first and second electrodes 40a and 40b are preferably embodied as plate electrodes 40a and 40b. The first and second electrodes 40a and 40b are preferably oriented as plate electrodes 40a and 40b parallel to the second spatial direction 16b and/or the first axis of symmetry 28 (not outlined) of the coupling structure 26.

In addition, the operating apparatus 14 has two third electrodes 40c and two fourth plate electrodes 40d, wherein one of the third electrodes 40c and one of the fourth electrodes 40d are arranged spaced apart in the second spatial direction 16b on the first seismic mass 10a, and another of the third electrodes 40c and another of the fourth electrodes 40d are arranged spaced apart in the second spatial direction 16b on the second seismic mass 10b. The third electrodes 40c are positioned in such a way that the seismic masses 10a and 10b oscillate simultaneously toward the respectively assigned third electrode 40c or simultaneously away from the respectively assigned third electrode 40c. This can also be paraphrased in such a way that the two third electrodes 40c lie asymmetrically with respect to one another. The fourth electrodes 40d can also be arranged asymmetrically with respect to one another on the sensor device in such a way that the seismic masses 10a and 10b oscillate simultaneously toward the respectively assigned fourth electrode 40d or simultaneously away from the respectively assigned fourth electrode 40d. The third and fourth electrodes 40c and 40d can also be plate electrodes 40c and 40d. The third and fourth electrodes 40c and 40d are oriented as plate electrodes 40c and 40d preferably parallel to the first spatial direction 16a and/or the second axis of symmetry 30 (not outlined) of the coupling structure 26.

Furthermore, the operating apparatus 14 has two fifth electrodes 40e and two sixth electrodes 40f, wherein one of the fifth electrodes 40e and one of the sixth electrodes 40f are arranged spaced apart in the third spatial direction 16c on the first seismic mass 10a, and another of the fifth electrodes 40e and another of the sixth electrodes 40f are arranged spaced apart in the third spatial direction 16c on the second seismic mass 10b. The fifth electrodes 40e can also be positioned in such a way that the seismic masses 10a and 10b simultaneously oscillate toward the respectively assigned fifth electrode 40e or simultaneously away from the respectively assigned fifth electrode 40e. The sixth electrodes 40f can also be arranged in such a way that the seismic masses 10a and 10b oscillate simultaneously toward the respectively assigned sixth electrode 40f or simultaneously away from the respectively assigned sixth electrode 40f. The fifth and sixth electrodes 40e and 40f can be plate electrodes 40e and 40f. In this case, the fifth and sixth electrodes 40e and 40f are preferably oriented parallel to a plane extending from the spatial directions 16a and 16b (or the axes of symmetry 28 and 30) and/or perpendicularly with respect to the third spatial direction 16c.

Each of the electrodes 40a to 40f implements, together with the adjacent seismic mass 10a or 10b as an opposing electrode, a capacitive plate capacitor. The electrodes 40a to 40d can be used both to drive the seismic masses 10a and 10b in their desired oscillating motions as well as to determine/detect deflection motions of a seismic mass 10a and 10b (in addition to the oscillating motions) on the basis of a Coriolis force or a Lorentz force. For example, the operating apparatus 14 can be configured to use the electrodes 40a to 40d in a clocked fashion for driving or for determining/detecting. During a first step which is carried out repeatedly, the operating apparatus 14 can apply, to the first and/or second electrodes 40a and 40b, a voltage, varying with the first frequency f1, for exciting the first harmonic oscillation of the seismic mass 10a and 10b, and to the third and/or fourth electrodes 40c and 40d, a voltage, varying with the second frequency f2, for exciting the second harmonic oscillation of the seismic mass 10a and 10b. In a second clock pulse which is respectively implemented between two first clock pulses, the operating apparatus 14 can determine the voltages and/or capacitances which are respectively present at the capacitors of the electrodes 40a to 40d. By means of the first and/or second electrodes 40a and 40b it is possible to determine deflection motions of the seismic masses 10a and 10b in the first spatial direction 16a. On the basis of the third and/or fourth electrodes 40c and 40d, deflection motions of the seismic masses 10a and 10b in the second spatial direction 16b can be detected. As an alternative to the clocked use of the electrodes 40a to 40d as driving electrodes and detection electrodes, by means of a multiplex operation it is possible to form further electrodes on the sensor device. The electrodes 40e and 40f can be used for checking/detecting deflection motions of the seismic masses 10a and 10b in the third spatial direction 16c.

The embodiments in FIGS. 1 to 4 can be equipped with electrodes 40a to 40f for simultaneous multi-frequency driving and/or for detecting the deflection motions. Instead of the electrodes 40a to 40f which are embodied as plate electrodes 40a to 40f, all the embodiments described above can, however, also be equipped with another type of electrode such as, for example, comb electrodes. In all the embodiments, magnetic actuators and/or piezo-actuators can also be used for advantageous simultaneous multi-frequency driving and/or for determining/detecting the deflection motions of the seismic masses 10, 10a and 10b.

In the embodiments in FIGS. 1 to 5, the sensor devices are embodied as rotational rate sensor components or rotational rate sensors. Since they can be manufactured in a small and lightweight form, each of the sensor devices can easily be arranged/attached to a rotatable body in such a way that during a rotation of the rotatable body the respective sensor device also rotates. If the rotatable body rotates with the attached sensor device, the Coriolis force brings about a deflection motion of the at least one seismic mass 10, 10a and 10b perpendicularly with respect to the driving motion and perpendicularly with respect to the rotational axis. This deflection motion of the at least one seismic mass 10, 10a and 10b can be detected/measured by means of at least one measuring element of the operating apparatus 14. The at least one measuring element of the operating apparatus 14 can be, for example, a capacitive measuring element (in particular the electrodes 40a to 40f), a piezo-electric measuring element, a piezo-resistive measuring element and/or a magnetic measuring element. Subsequently, the operating apparatus 14 can evaluate, by means of its electronics, the detected/measured deflection motion of the at least one seismic mass 10, 10a and 10b and in this way define and output information relating to the rotational motion of the sensor device or of the rotatable body which has taken place. For example, the operating apparatus 14 can be configured to define and output a rotational rate, a rotational speed, an angular speed, a rotational intensity and/or a rotational force, taking into account at least one variable which represents the deflection motion of the at least one seismic mass 10, 10a and 10b. It is also possible to output just one signal/warning signal as the information relating to the rotational motion of the sensor device or of the rotatable body, said signal indicating that the rotatable body has rotated.

However, on the basis of the embodiments described above it is also possible to implement a Lorentz-force-based magnetic field sensor. In the case of such a Lorentz-force-based magnetic field sensor, a magnetic field brings about a Lorentz force acting on the at least one moved seismic mass 10, 10a and 10b, which Lorentz force also triggers a deflection motion, oriented perpendicularly with respect to the driving motion and with respect to the magnetic field, of the at least one seismic mass, 10, 10a and 10b. The operating apparatus 14 can therefore also be configured to define and output information relating to a magnetic field strength of the magnetic field taking into account at least one variable which represents the deflection motion of the at least one seismic mass 10, 10a and 10b. A signal/warning signal can also be output as information relating to the magnetic field strength of the magnetic field, by means of the operating apparatus. All the sensor devices described above can therefore also be used (in a possibly modified form) as components for Lorentz-force-based magnetic field sensors or as Lorentz-force-based magnetic field sensors.

It is to be noted that the operating apparatus 14 can be embodied with comparatively simple and cost-effective electronics both in the case of a rotational rate sensor and in the case of a Lorentz-force-based magnetic field sensor. Therefore, a very compact and area-efficient implementation of the sensor devices described above is possible not only owing to the reduction in the seismic masses 10, 10a and 10b which are required for the sensor devices but also owing to the possibility of using electronics with a simple embodiment for the operating apparatus 14.

In all the sensor devices, the operating apparatus 14 can be configured to determine at least one first variable relating to a periodic deflection of the first seismic mass 10 or 10a with the first frequency f1 in the third spatial direction 16c and/or a periodic deflection of the second seismic mass 10b with the first frequency f1 in the third spatial direction 16c. Subsequently, at least one information item relating to a rotational motion/partial rotational motion of the sensor device (or of the rotatable body) about the second spatial direction 16b or relating to a component of a magnetic field which is oriented in the second spatial direction 16b is defined and output taking into account the at least one first variable which is determined. During a harmonic oscillation of the at least one seismic mass 10, 10a and 10b with the first frequency f1 in the first spatial direction 16a, a rotational motion/partial rotational motion of the sensor device (or of the rotatable body which is investigated therewith) about the second spatial direction 16b or a magnetic field with a component (unequal to zero) which is oriented in the second spatial direction 16b brings about a Coriolis force/Lorentz force (unequal to zero) which is oriented in the third spatial direction 16c. The Coriolis force/Lorentz force (unequal to zero) which is oriented in the third spatial direction 16c triggers a periodic deflection of the at least one seismic mass 10, 10a and 10b with the first frequency f1 in the third spatial direction 16c (or out of a plane extending from the spatial directions 16a and 16b). The operating apparatus 14 can make use of these physical facts.

Likewise, the operating apparatus 14 can be configured to determine at least one second variable relating to a periodic deflection of the first seismic mass 10 or 10a with the second frequency f2 in the third spatial direction 16c and/or a periodic deflection of the second seismic mass 10b with the second frequency f2 in the third spatial direction 16c, and to define and output at least one information item relating to a rotational motion/partial rotational motion of the sensor device about the first spatial direction 16a, or relating to a component of a magnetic field which is oriented in the first spatial direction 16a, taking into account the at least one second variable which is determined. The motion of the at least one seismic mass 10, 10a and 10b with the second frequency f2 in the second spatial direction 16b, in the case of which a rotational motion/partial rotational motion of the sensor device about the first spatial direction 16a or a magnetic field with a component (unequal to zero) which is oriented in the first spatial direction 16a brings about a Coriolis force/Lorentz force (unequal to zero) which is oriented in the third spatial direction 16c or a periodic deflection of the at least one seismic mass 10, 10a and 10b in the third spatial direction 16c/out of a plane extending from the spatial directions 16a and 16b, can be used to determine the rotational motion/partial rotational motion of the sensor device (or of the rotatable body investigated therewith) about the first spatial direction 16a, or for determining a magnetic field strength of the magnetic field in the first spatial direction 16a.

As an alternative or in addition to the embodiment possibilities described above, the operating apparatus 14 can also be configured to determine at least one third variable relating to a periodic deflection of the first seismic mass 10 or 10a with the first frequency f1 in the second spatial direction 16b, a periodic deflection of the first seismic mass 10 or 10a with the second frequency f2 in the first spatial direction 16a, a periodic deflection of the second seismic mass 10b with the first frequency f1 in the second spatial direction 16b and/or a periodic deflection of the second seismic mass 10b with the second frequency f2 in the first spatial direction 16a. If appropriate, the operating apparatus 14 is preferably configured to define and output at least one information item relating to a rotational motion/partial rotational motion of the sensor device about the third spatial direction 16c, or relating to a component of a magnetic field which is oriented in the third spatial direction 16c, taking into account the at least one third variable which is determined. In the case of an oscillating motion of the at least one seismic mass 10, 10a and 10b with the first frequency f1 in the first spatial direction 16a, a rotational motion/partial rotational motion of the sensor device (or of the rotatable body investigated therewith) about the third spatial direction 16c or a magnetic field with a component (unequal to zero) which is oriented in the third spatial direction 16c triggers a periodic deflection of the at least one seismic mass 10, 10a and 10b with the first frequency f1 in the second spatial direction 16b. Correspondingly, in this situation the oscillation of the at least one seismic mass 10, 10a and 10b with the second frequency f2 in the second spatial direction 16b also brings about a Coriolis force/Lorentz force which is oriented in the first spatial direction 16a, for which reason that at least one seismic mass 10, 10a and 10b executes a periodic deflection with the second frequency f2 in the first spatial direction 16a. These physical facts can also be used by means of the operating apparatus 14.

In order to determine the at least one first variable, in the embodiment in FIG. 5 it is possible, for example, to measure a difference in capacitance, present between the first seismic mass 10a and the adjacent fifth electrode 40e, from a capacitance which is present between the second seismic mass 10b and the adjacent fifth electrode 40e, as a differential capacitance signal Ce and a difference in capacitance, which is present between the first seismic mass 10a and the adjacent sixth electrode 40f, from a capacitance which is present between the second seismic mass 10b and the adjacent sixth electrode 40f, as a differential capacitance signal Cf. The modulation of a difference in the differential capacitance signals Ce and Cf with the first frequency f1 can subsequently be evaluated further as the at least one first variable for defining the information. Demodulation of the difference in the differential capacitance signals Ce and Cf with the second frequency f2 can be determined as the at least one second variable. In order to determine the at least one third variable, in the embodiment in FIG. 5 it is possible, for example, to measure a difference in capacitance, present between the first seismic mass 10a and the adjacent first electrode 40a, from a capacitance, present between the second seismic mass 10b and the adjacent first electrode 40a, as a differential capacitance signal Ca, and a difference in capacitance, present between the first seismic mass 10a and the adjacent second electrode 40b, from a capacitance, present between the second seismic mass 10b and the adjacent second electrode 40b, as a differential capacitance signal Cb. The at least one third variable can subsequently be defined by means of demodulation of a difference in the differential capacitance signals Ca and Cb with the second frequency f2. As an alternative or in addition, a difference in a capacitance, which is present between the first seismic mass 10a and the adjacent third electrode 40c, from a capacitance, which is present between the second seismic mass 10b and the adjacent third electrode 40c, can be determined as a differential capacitance signal Cc, and a difference in a capacitance, which is present between the first seismic mass 10a and the adjacent fourth electrode 40d, from a capacitance, which is present between the second seismic mass 10b and the adjacent fourth electrode 40d, can be determined as a differential capacitance signal Cd. The at least one third variable can also be defined by means of demodulation of a difference in the differential capacitance signals Cc and Cd with the first frequency f1.

Optionally, demodulation of the difference in the differential capacitance signals Ca and Cb with the first frequency f1 and/or demodulation of the difference in the differential capacitance signals Cc and Cd with the second frequency f2 can also be used for driving detection in the embodiment in FIG. 5. The method of driving the sensor device in FIG. 5 automatically has the effect that by means of the demodulation of the difference in the differential capacitance signals Ca and Cb with the first frequency f1 and/or the demodulation of the difference in the differential capacitance signals Cc and Cd with the second frequency f2 not only the driving motion can be measured without disruption of the sensor detection (on the basis of the various frequencies f1 and f2), but also an additional redundancy, for example for suppressing noise signals and interference signals, is also ensured.

The oscillating motion of the at least one seismic mass 10, 10a and 10b, which can be paraphrased as a superposition from the first harmonic oscillation (with the first frequency f1 in the first spatial direction 16a) and the second harmonic oscillation (with the second frequency f2 in the second spatial direction 16b), can therefore advantageously be used to define with at maximum two seismic masses 10, 10a or 10b, specifically with just one seismic mass 10, information/values relating to all three spatial directions 16a, 16b and 16c. Despite the at maximum two seismic masses 10, 10a or 10b, each of the sensor devices can therefore have three sensitive axes. It is also to be noted that the comparatively large number of sensitive axes are simultaneously ensured with the advantages of anti-parallel oscillation in all the embodiments in FIGS. 3 to 5 even though these only comprise/have the first seismic mass 10a and the second seismic mass 10b as seismic masses 10a and 10b.

FIG. 6 shows a flowchart explaining an embodiment of the method for operating a sensor device having at least one seismic mass.

The method described below can be executed, for example by means of any of the sensor devices described above. However, it is to be noted that the implementability of the method is not limited to the use of such a sensor device.

In a method step S1 at least one (first) seismic mass is set in an oscillating motion in such a way that a projection of the oscillating motion of the (first) seismic mass onto a first spatial direction produces a first harmonic oscillation of the (first) seismic mass with a first frequency in the first spatial direction and at the same time a projection of the oscillating motion of the (first) seismic mass onto a second spatial direction which is oriented inclined with respect to the first spatial direction produces a second harmonic oscillation of the (first) seismic mass with a second frequency which is unequal to the first frequency in the second spatial direction.

With the method step S1, a method step S2 is also optionally executed in a chronologically overlapping/simultaneous fashion. In the method step S2, at least one second seismic mass (in addition to the first seismic mass) is also set in an oscillating motion in such a way that a projection of the oscillating motion of the second seismic mass onto the first spatial direction oscillates asymmetrically with respect to the first harmonic oscillation of the first seismic mass, and at the same time a projection of the oscillating motion of the second seismic mass onto the second spatial direction oscillates asymmetrically with respect to the second harmonic oscillation of the first seismic mass. This can also be paraphrased in such a way that the projection of the oscillating motion of the second seismic mass onto the first spatial direction is phase-shifted/in anti-phase by 180° with respect to the first harmonic oscillation of the first seismic mass, and at the same time the projection of the oscillating motion of the second seismic mass onto the second spatial direction is phase-shifted/in anti-phase by 180° with respect to the second harmonic oscillation of the first seismic mass.

At least one of the further method steps S3 to S5 can additionally also be executed. In a method step S3, at least one first variable relating to a periodic deflection of the first seismic mass with the first frequency in a third spatial direction which is oriented inclined with respect to the first spatial direction and the second spatial direction and/or a periodic deflection of the second seismic mass with the first frequency in the third spatial direction is determined. Subsequently, at least one information item relating to a rotational motion/partial rotational motion of the sensor device about the second spatial direction or relating to a component of a magnetic field which is oriented in the second spatial direction is defined, taking into account the at least one first variable which is determined.

Likewise, in a method step S4, at least one second variable relating to a periodic deflection of the first seismic mass with the second frequency in the third spatial direction and/or a periodic deflection of the second seismic mass with the second frequency in the third spatial direction can be determined, wherein at least one information item relating to a rotational motion/partial rotational motion of the sensor device about the first spatial direction or relating to a component of a magnetic field which is oriented in the first spatial direction is defined, taking into account the at least one second variable which is determined.

As an alternative to, or in addition to, the method steps S3 and S4, in a method step S5 at least one third variable relating to a periodic deflection of the first seismic mass with the first frequency in the second spatial direction, a periodic deflection of the first seismic mass with the second frequency in the first spatial direction, a periodic deflection of the second seismic mass with the first frequency in the second spatial direction and/or a periodic deflection of the second seismic mass with the second frequency in the first spatial direction can be determined. After this, at least one information item relating to a rotational motion/partial rotational motion of the sensor device about the third spatial direction or relating to a component of a magnetic field, which is oriented in the third spatial direction, is preferably defined taking into account the at least one third variable which is determined. Examples of the at least one first, second and/or third variable have already been described above.

A rotational rate sensor or a Lorentz-force-based magnetic field sensor can be operated as the sensor device by means of the method described here. The advantages already enumerated above occur here.

The invention claimed is:

1. A sensor device, comprising:
   at least one first seismic mass;
   at least one second seismic mass;
   an operating apparatus configured to set the first seismic mass in a first oscillating motion and to set the second seismic mass in a second oscillating motion such that:
   (i) a projection of the first oscillating motion onto a first spatial direction is a first harmonic oscillation of the first seismic mass with a first frequency in the first spatial direction;
   (ii) a projection of the first oscillating motion onto a second spatial direction oriented at an angle with respect to the first spatial direction is a second harmonic oscillation of the first seismic mass with a second frequency which is unequal to the first frequency in the second spatial direction;
   (iii) a projection of the second oscillating motion onto the first spatial direction is asymmetrical with respect to the first harmonic oscillation of the first seismic mass; and
   (iv) a projection of the second oscillating motion onto the second spatial direction is asymmetrical with respect to the second harmonic oscillation of the first seismic mass, wherein the operating apparatus is further configured to:
   determine at least a first variable relating to at least one of:
   a periodic deflection of the first seismic mass with the first frequency in a third spatial direction oriented at a respective angle with respect to each of the first spatial direction and the second spatial direction; and
   a periodic deflection of the second seismic mass with the first frequency in the third spatial direction; and
   define and output at least one information item relating to (i) a rotational motion of the sensor device about the second spatial direction or (ii) a component of a magnetic field which is oriented in the second spatial direction, with reference to the at least one first variable which is determined.

2. The sensor device as claimed in claim 1, further comprising a coupling structure that connects the first seismic mass to the second seismic mass.

3. The sensor device as claimed in claim 1, wherein the operating apparatus is further configured to:
   determine at least one second variable relating to at least one of:
   a periodic deflection of the first seismic mass with the second frequency in the third spatial direction; and
   a periodic deflection of the second seismic mass with the second frequency in the third spatial direction; and
   define and output at least one information item relating to (i) a rotational motion of the sensor device about the first spatial direction or (ii) a component of a magnetic field which is oriented in the first spatial direction, with reference to the at least one second variable which is determined.

4. The sensor device as claimed in claim 1, wherein the operating apparatus is further configured to:
   determine at least one of:
   at least one third variable relating to a periodic deflection of the first seismic mass with the first frequency in the second spatial direction,
   a periodic deflection of the first seismic mass with the second frequency in the first spatial direction;
   a periodic deflection of the second seismic mass with the first frequency in the second spatial direction; and
   a periodic deflection of the second seismic mass with the second frequency in the first spatial direction and
   define and output at least one information item relating to (i) a rotational motion of the sensor device about a third spatial direction oriented at respective angles with respect to each of the first spatial direction and the second spatial direction, or (ii) a component of a magnetic field which is oriented in the third spatial direction, with reference to the at least one third variable which is determined.

5. The sensor device as claimed in claim 1, wherein the operating apparatus includes at least one of:
   at least one first electrode spaced along the first spatial direction and disposed on at least one of the first seismic mass and the second seismic mass;
   at least one second electrode spaced along the second spatial direction and disposed on at least one of the first seismic mass and the second seismic mass; and
   at least one third electrode spaced along a third spatial direction oriented at a respective angle with respect to each of the first spatial direction and the second spatial direction, and disposed on at least one of the first seismic mass and the second seismic mass.

6. The sensor device as claimed in claim 1, wherein:
   the at least one first seismic mass consists of a single first seismic mass;
   the at least one second seismic mass consists of a single second seismic mass; and
   the sensor device comprises only the single first seismic mass and the single second seismic mass as seismic masses.

7. The sensor device as claimed in claim 1, wherein the sensor device is configured to operate as a rotational rate sensor component, a rotational rate sensor, a component for a Lorentz-force-based magnetic field sensor, or a Lorentz-force-based magnetic field sensor.

8. A method for operating a sensor device having at least one first seismic mass, comprising:
   setting at least one first seismic mass into an oscillating motion using an operating apparatus such that
   a projection of the oscillating motion of the first seismic mass onto a first spatial direction produces a first harmonic oscillation of the first seismic mass with a first frequency in the first spatial direction, and a projection of the oscillating motion of the first seismic mass onto a second spatial direction oriented at an angle with respect to the first spatial direction produces a second harmonic oscillation of the first seismic mass with a second frequency which is unequal to the first frequency in the second spatial direction;

setting at least one second seismic mass into an oscillating motion such that a projection of the oscillating motion of the second seismic mass onto the first spatial direction oscillates asymmetrically with respect to the first harmonic oscillation of the first seismic mass, a projection of the oscillating motion of the second seismic mass onto the second spatial direction oscillates asymmetrically with respect to the second harmonic oscillation of the first seismic mass;

determining at least one first variable relating to at least one of a periodic deflection of the first seismic mass with the first frequency in a third spatial direction oriented at respective angles with respect to each of the first spatial direction and the second spatial direction, and a periodic deflection of the second seismic mass with the first frequency in the third spatial direction; and defining at least one information item relating to (i) a rotational motion of the sensor device about the second spatial direction or (ii) a component of a magnetic field oriented in the second spatial direction, with reference to the at least one first variable which is determined.

9. The method as claimed in claim 8, further comprising determining at least one second variable relating to at least one of:

a periodic deflection of the first seismic mass with the second frequency in the third spatial direction; and a periodic deflection of the second seismic mass with the second frequency in the third spatial direction; and defining at least one information item relating to (i) a rotational motion of the sensor device about the first spatial direction or (ii) a component of a magnetic field which is oriented in the first spatial direction is defined, with reference to the at least one second variable which is determined.

10. The method as claimed in claim 8, further comprising:

determining at least one third variable relating to at least one of:

a periodic deflection of the first seismic mass with the first frequency in the second spatial direction;

a periodic deflection of the first seismic mass with the second frequency in the first spatial direction;

a periodic deflection of the second seismic mass with the first frequency in the second spatial direction; and a periodic deflection of the second seismic mass with the second frequency in the first spatial direction; and defining at least one information item relating to (i) a rotational motion of the sensor device about a third spatial direction oriented at respective angles with respect to each of the first spatial direction and the second spatial direction or (ii) a component of a magnetic field which is oriented in the third spatial direction with reference to the at least one third variable which is determined.

11. The method as claimed in claim 8, wherein the sensor device is operated as a rotational rate sensor or a Lorentz-force-based magnetic field sensor.

* * * * *